(12) United States Patent  
Meyer

(10) Patent No.: US 10,046,524 B2
(45) Date of Patent: Aug. 14, 2018

(54) SUBSTRATE FOR ADDITIVE MANUFACTURING

(71) Applicant: AIRBUSGROUP LIMITED, London (GB)

(72) Inventor: Jonathan Meyer, Calne (GB)

(73) Assignee: AIRBUSGROUP LIMITED, London (GB)

( * ) Notice: Subject to any disclaimer, the term of this patent is extended or adjusted under 35 U.S.C. 154(b) by 789 days.

(21) Appl. No.: 14/386,742

(22) PCT Filed: Mar. 18, 2013

(86) PCT No.: PCT/GB2013/050686
§ 371 (c)(1),
(2) Date: Sep. 19, 2014

(87) PCT Pub. No.: WO2013/140146
PCT Pub. Date: Sep. 26, 2013

(65) Prior Publication Data
US 2015/0054193 A1    Feb. 26, 2015

(30) Foreign Application Priority Data
Mar. 21, 2012 (GB) .................................. 1204922.7

(51) Int. Cl.
*B41J 2/415*    (2006.01)
*B29C 67/00*    (2017.01)
(Continued)

(52) U.S. Cl.
CPC .......... *B29C 67/0092* (2013.01); *B29C 64/00* (2017.08); *B29C 64/153* (2017.08);
(Continued)

(58) Field of Classification Search
CPC ........................... B69C 67/0092; B33Y 30/00
See application file for complete search history.

(56) References Cited

U.S. PATENT DOCUMENTS

2007/0023977 A1    2/2007 Braun et al.
2008/0170112 A1*   7/2008 Hull .................... B29C 67/0092
                                                              347/127
(Continued)

FOREIGN PATENT DOCUMENTS

EP    1279480 A1    1/2003
GB    2458745 A    10/2009
(Continued)

OTHER PUBLICATIONS

Azuma et al., JP 2001018298 A, Machine Translation, Jan. 23, 2001.*
(Continued)

*Primary Examiner* — Galen H Hauth
(74) *Attorney, Agent, or Firm* — Hauptman Ham, LLP

(57) ABSTRACT

A substrate for an additive manufacturing process, the substrate having a build surface for fusing to a part being formed on the substrate by the additive manufacturing process, wherein the substrate is configured to provide relatively high stiffness in a direction substantially perpendicular to the build surface, while having a low longitudinal stiffness in the plane of the build surface. Also, a method of forming the substrate, a system including the substrate, and use of the system for creating a part by an additive manufacturing process.

47 Claims, 4 Drawing Sheets

(51) Int. Cl.
*B33Y 30/00* (2015.01)
*B29C 64/00* (2017.01)
*B29C 64/153* (2017.01)
*B29C 64/20* (2017.01)
*B29C 64/40* (2017.01)
*B22F 3/105* (2006.01)
*B29L 31/00* (2006.01)

(52) U.S. Cl.
CPC .............. *B29C 64/20* (2017.08); *B29C 64/40* (2017.08); *B33Y 30/00* (2014.12); *B22F 2003/1056* (2013.01); *B29K 2995/0082* (2013.01); *B29L 2031/757* (2013.01); *Y02P 10/295* (2015.11)

(56) References Cited

U.S. PATENT DOCUMENTS

| | | | | |
|---|---|---|---|---|
| 2009/0117403 | A1* | 5/2009 | Sutcliffe | B22F 3/1055 428/650 |
| 2011/0192997 | A1 | 8/2011 | Vogtmeier | |
| 2013/0256953 | A1 | 10/2013 | Teulet | |

FOREIGN PATENT DOCUMENTS

| | | | |
|---|---|---|---|
| JP | 2001018298 A | * | 1/2001 |
| JP | 2003-305778 A | | 10/2003 |
| WO | 2005/025781 A1 | | 3/2005 |
| WO | 2010044008 A1 | | 4/2010 |
| WO | 2010/049696 A2 | | 5/2010 |
| WO | 2011/086450 A2 | | 7/2011 |

OTHER PUBLICATIONS

European Office Action dated Sep. 16, 2016 EP Application No. 13711944.2.
International Search Report dated Jun. 6, 2013 in International Application No. PCT/GB2013/050686, filed Mar. 18, 2013.
Search Report dated Jul. 18, 2012 in Great Britain Application No. GB1204922.7.
JP-PCT Office Action dated Nov. 8, 2016 JP Patent Application No. 2015-500982.

* cited by examiner

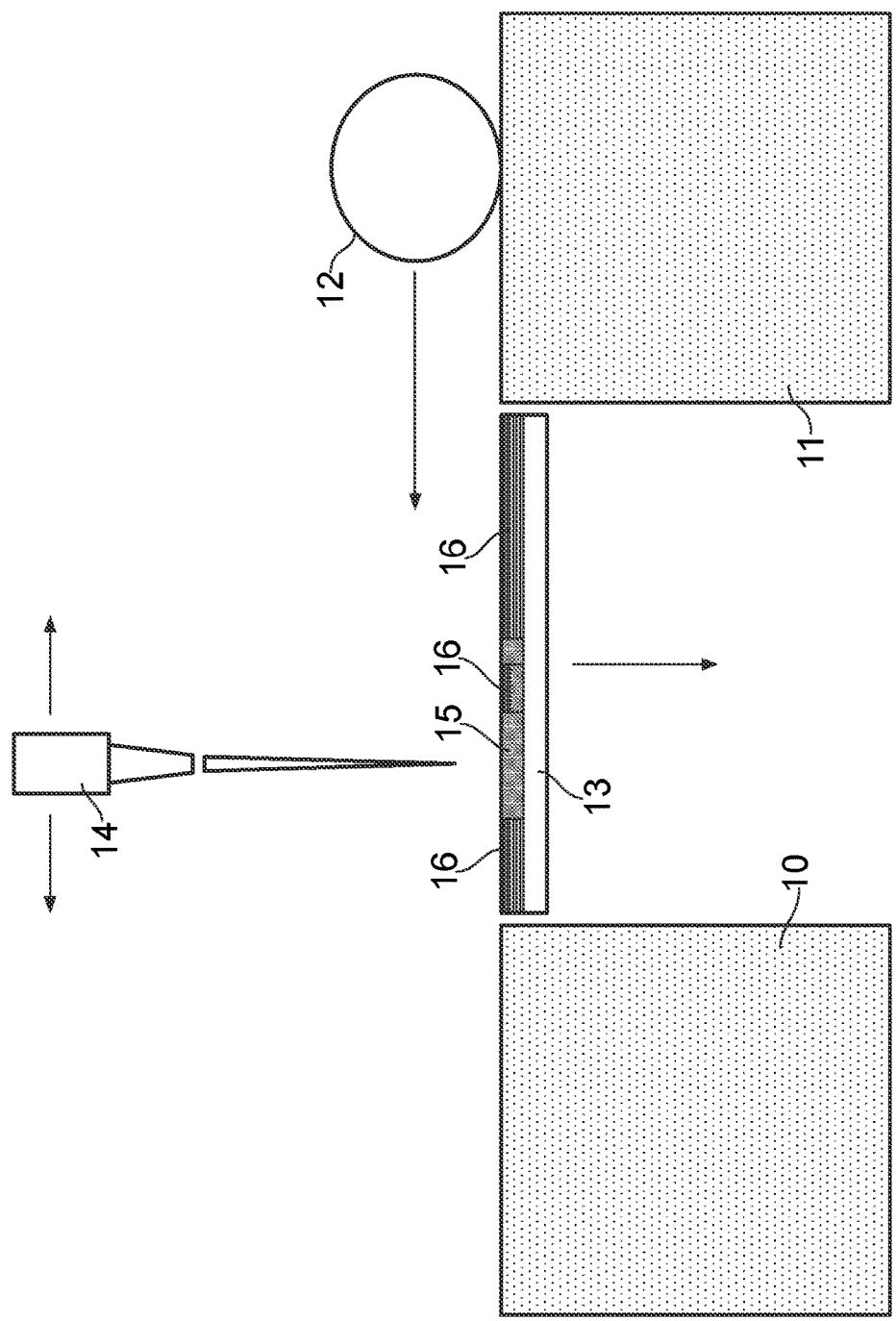

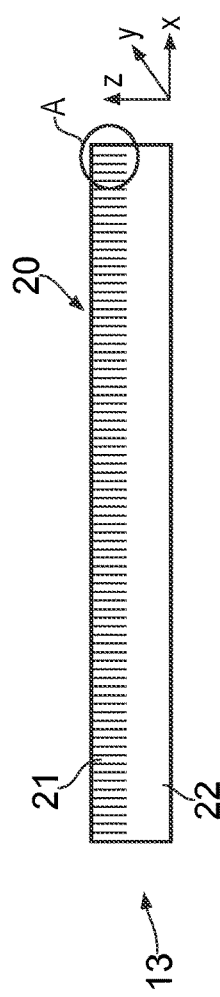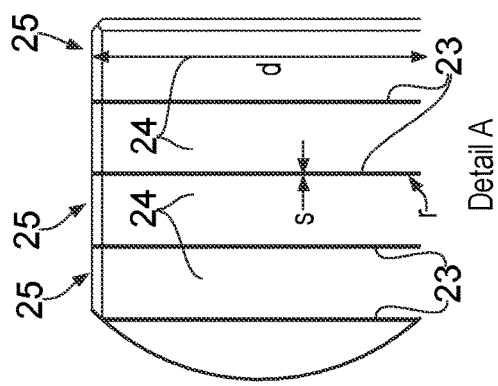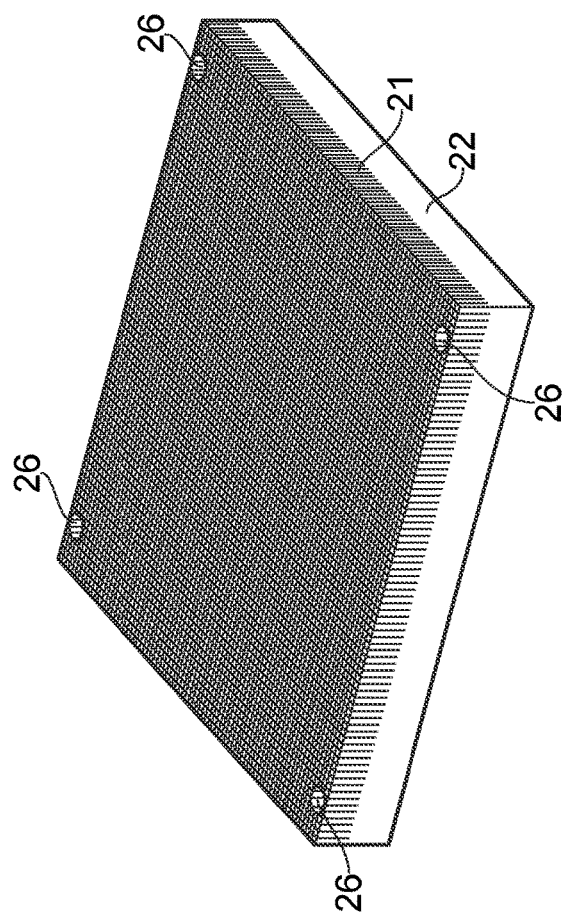

US 10,046,524 B2

SUBSTRATE FOR ADDITIVE MANUFACTURING

RELATED APPLICATIONS

The present application is a National Phase of International Application Number PCT/GB2013/050686, filed Mar. 18, 2013, and claims priority from Great Britain Application Number 1204922.7, filed Mar. 21, 2012.

FIELD OF THE INVENTION

The present invention relates to a substrate for an additive manufacturing process, a method of forming the substrate, a system including the substrate, and use of the system for creating a part by an additive manufacturing process.

BACKGROUND OF THE INVENTION

Additive manufacturing is a process by which an article is produced by joining materials together. Additive layer manufacturing (ALM) involves producing the article layer by layer using 3D model data. The process may be used for producing prototypes, samples, models, tooling or full scale components.

A known ALM technique uses a power beam, such as a laser or an electron beam for example, to selectively sinter powdered material. A layer of the powdered material is laid over a substrate (also known as a build plate, start plate, start platform or build platform) in a sintering chamber to provide a "powder bed". The powder is applied using a re-coating blade. The power beam is used to selectively sinter the powder in a desired pattern by scanning across the surface of the powder bed. The power beam is controlled to produce the desired pattern according to cross-sections generated from 3D model data (e.g. a CAD file) of the article.

After each cross-section is scanned and the melted powder has solidified, the substrate is lowered by one layer thickness (typically of the order of 0.1 mm) to prepare for growth of the next layer. Another layer of the powder is applied on top of the preceding layer in preparation for sintering. The process is repeated until the article is completed. Thus as the process proceeds, a sintered article is constructed, supported by unconsolidated powder. After the article has been completed it is removed from the substrate and the unconsolidated powder is typically recycled to produce another article by the same ALM process.

Selective sintering may be used to produce shaped articles from powders of some metals, ceramics, glasses and thermoplastic polymers.

Due to the thermal energy involved in sintering the powder it is generally necessary to constrain the article during the build against thermal residual stresses which tend to make the article curl up, clashing with the re-coating blade and causing the build to fail. The article is generally constrained by fusing it to the substrate. In conventional processing a thick, solid substrate is used and the first layer of powder is fused to this, with subsequent layers being built on top. The fusion to the substrate provides the desired constraint in the z-axis (through layers) but also applies an additional constraint in the x-y plane, resulting in high residual stresses in the article which cannot be relieved during the build process. This can lead to bending of the substrate, and distortion and cracking of the article.

Currently, there are some ALM processes that make use of either a heated sintering chamber, or a heated substrate in order to reduce the level of differential shrinkage between the article and the substrate. This can reduce the level of residual stress, but has other drawbacks. The heated nature of the process results in a significant increase in system complexity, requiring heat shielding of sensitive electronics. It also changes the environment of the process, changing cooling characteristics which can be advantageous for some alloys, but can have a severe detrimental effect on other, e.g. Scalmalloy™, which requires fast solidification and high cooling rates.

SUMMARY OF THE INVENTION

A first aspect of the invention provides a substrate for an additive manufacturing process, the substrate having a build surface for fusing to a part being formed on the substrate by the additive manufacturing process, wherein the substrate is configured to provide relatively high stiffness in a direction substantially perpendicular to the build surface, whilst having a low longitudinal stiffness in the plane of the build surface.

A further aspect of the invention provides a substrate for an additive manufacturing process, the substrate having a build surface for fusing to a part being formed on the substrate by the additive manufacturing process, wherein the substrate has an upper portion nearest the build surface and a lower portion, and wherein the upper portion includes an array of protrusions with their longitudinal axis aligned substantially perpendicular to the build surface.

A further aspect of the invention provides a substrate for an additive manufacturing process, the substrate having a build surface for fusing to a part being formed on the substrate by the additive manufacturing process, and one or more slits extending from the build surface through part of the thickness of the substrate.

A further aspect of the invention provides a substrate for an additive manufacturing process, the substrate having a build surface for fusing to a part being formed on the substrate by the additive manufacturing process, wherein the substrate has an upper portion nearest the build surface and a lower portion, and wherein the upper portion includes a different material to that of the lower portion.

A further aspect of the invention provides a system for creating a part by an additive manufacturing process, the system including a substrate in accordance with one or more aspects of the invention.

A further aspect of the invention provides a method of forming a substrate for an additive manufacturing process, comprising providing a plate, and cutting one or more slits extending from the upper surface of the plate through part of the thickness of the plate.

A further aspect of the invention provides a method of forming a substrate for an additive manufacturing process, comprising using an additive manufacturing process to form a substrate having an upper portion and a lower portion, wherein the upper portion includes an array of upstanding protrusions.

A further aspect of the invention provides use of a system according to the invention for creating a part by an additive manufacturing process.

The invention is advantageous in that the substrate allows high strain deformation in the plane of the build surface, but retains high stiffness in the direction of the build, i.e. perpendicular to the build surface. This effectively creates a sliding constraint at the interface between the substrate and the part being formed by the additive manufacturing process, allowing the part to shrink in the plane of the build surface and thereby avoiding the build up of large residual stresses. Preferred embodiments of the invention provide various ways in which this can be achieved.

The substrate may have an upper portion nearest the build surface and a lower portion, wherein the upper portion includes a different construction and/or material to that of the lower portion.

Where the upper portion includes an array of protrusions, the protrusions may be arranged to deform like beams in the plane of the build surface, whilst being substantially rigid in the direction perpendicular to the build surface.

The tops of the protrusions may provide at least a portion of the build surface. The entire upper portion of the substrate may comprise the protrusions, in which case the tops of the protrusions may provide the entire build surface. Alternatively, the protrusions may be provided on only a portion of the build surface. The remainder of the build surface may be solid. It may be advantageous to provide the protrusions only at those regions of the build surface upon which the part is to be built.

The bases of the protrusions may be integrally formed with the lower portion of the substrate. For example, the substrate may be a monolith. Alternatively, each protrusion, or an array of protrusions, may be attached to the lower portion of the substrate, e.g. by fastening. This may allow for use of a common lower portion with one of a plurality of different upper portions than can be exchanged.

The protrusions may be slender, preferably having an aspect ratio of at least 3. The aspect ratio is the ratio of the height of the protrusion vs. its width/depth. The larger the aspect ratio of the protrusions, for a given material, the greater their ability to deform as beams in the plane of the build surface. The aspect ratio may be in the range 3 to 10, preferably 4 to 8, and most preferably 5 to 6.

The protrusions may each have straight sides substantially perpendicular to the build surface. Alternatively, the protrusions may each have a taper of increasing cross section along their longitudinal axis. In particular, the protrusions may have a taper of increasing cross section towards the build surface, i.e. an inverse taper. In this way the base of the protrusions provide great flexibility, whilst the top of the protrusions have only a small gap to their neighbouring protrusions in the array.

The protrusions may take the form of pillars having a generally planar top. The pillars may have any cross section, but are preferably regularly shaped such that the gap between neighbouring pillars is substantially constant. For ease of manufacture, the pillars may have a rectangular section, constant along the length of the protrusion. Alternatively, a hexagonal, octagonal, circular, elliptical or other section may be provided.

A gap between adjacent protrusions may be filled by a material dissimilar to that of the protrusions. For example, the gap may be filled with a material of low stiffness as compared with that of the protrusions. Alternatively the gap may be an air gap, i.e. a material of negligible stiffness.

The protrusions may be formed by cutting slits in the substrate. The slits may be provided in an upper portion of the substrate, and a lower portion of the substrate may be substantially solid. The slits may take the form of a grid.

The build surface may be substantially rectangular and the grid may be aligned substantially with an edge or a diagonal of the build surface. Aligning with the diagonal may be preferable, such that the part being built by the additive manufacturing process may be arranged diagonally on the build surface. In this way larger parts can be built for a given size of substrate or ALM system.

The slits may be provided on only a portion of the build surface. The slits may have a substantially uniform width. The slits may have a particularly small width, e.g. approximately 0.1 mm, and a high aspect ratio. The aspect ratio is the length of the slit in the direction extending from the build surface vs. the slit width. The aspect ratio may therefore be at least 100, preferably at least 150, and may be up to approximately 500. Cutting the slits with such a high aspect ratio can be achieved using electrical discharge machining (EDM), e.g. wire EDM. Alternatively laser cutting may be used, for example.

The base of each slit may have a radius corner so as to protect against stress concentrations and crack propagation into the substrate from the end of the slit. The radius may be generally U-shaped or generally tear drop shaped. The radius may be at least 0.5 times the width of the slit, preferably at least 2 times.

In the case where the upper portion of the substrate has a different material to the lower portion, the lower portion may have a higher stiffness than the upper portion. The upper portion may be substantially solid, and free from slits, cuts, grooves, indentations or the like.

The upper portion may include a material of high ductility and low yield strength as compared with the material of the part intended to be fused to it during the additive manufacturing process.

The upper portion may include a includes a material of low elastic modulus and high strain to failure as compared with the material of the part intended to be fused to it during the additive manufacturing process.

The upper portion may include a material that is weldable with the material of the part intended to be fused to it during the additive manufacturing process.

Regardless of the material and/or construction of the substrate, the substrate may be re-useable for building successive part(s) by the additive manufacturing process. In particular, a top layer of the substrate may be adapted to be removed after each build to redefine the build surface. The thickness and/or construction of the upper portion of the substrate may be arranged to permit at least 5, and preferably at least 10, builds. A thickness of approximately 1 mm may be milled, or otherwise removed, from the top of the substrate to redefine the build surface after each build. Removing this material from the substrate is intended to remove any material that may have plastically deformed during the previous build, leaving only material that has elastically deformed remaining in the substrate. The material properties, and/or the construction (e.g. slit gap width) in the build surface may therefore be restored.

The additive manufacturing process typically progresses by creating the part layer by layer. For example, the part may be created by selectively sintering successive powder layers. However, the substrate may alternatively be used with other additive manufacturing processes.

BRIEF DESCRIPTION OF THE DRAWINGS

Embodiments of the invention will now be described with reference to the accompanying drawings, in which:

FIG. 1 illustrates schematically a powder bed ALM processing system;

FIG. 2 illustrates a side view of the substrate of the system;

FIG. 3 illustrates a detail view of region A of FIG. 2;

FIG. 4 illustrates a three-dimensional view of the substrate;

DETAILED DESCRIPTION OF EMBODIMENT(S)

Figure 5:
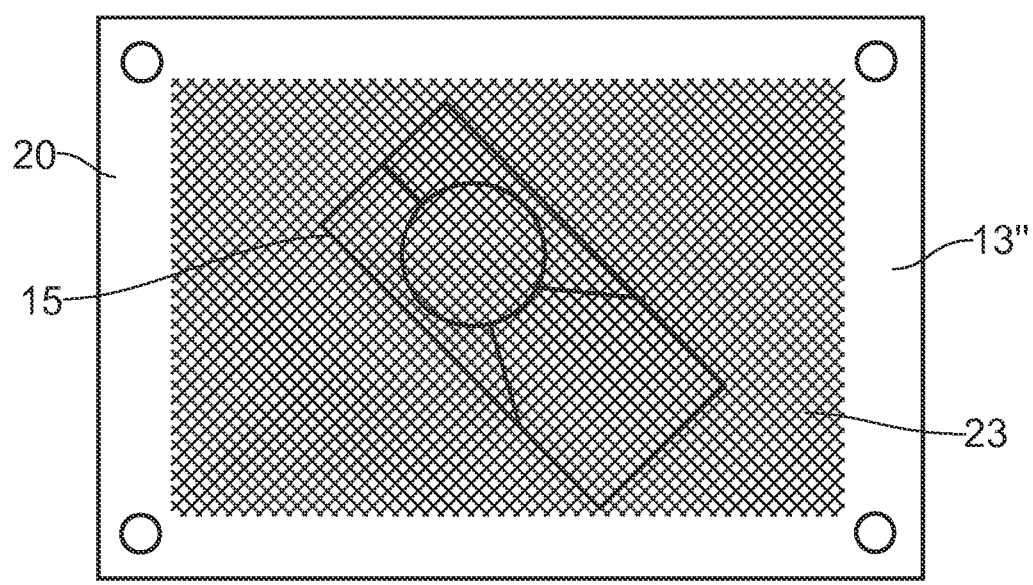
FIG. 5 illustrates a plan view of another embodiment of the substrate, showing a part built upon the substrate.

FIG. 1 illustrates a cold powder bed processing additive layer manufacturing (ALM) system. The system is "cold" in that the processing environment is at ambient temperature, and is not maintained at an elevated temperature. The system comprises a pair of feed containers 10, 11 containing powdered metallic material such as powdered Titanium. A roller 12 picks up powder from one of the feed containers (in the example of FIG. 1, the roller 12 is picking up powder from the right hand feed container) and rolls a continuous bed of powder over a substrate 13. A laser head 14 then scans over the powder bed, and a laser beam from the head is turned on and off to melt the powder in a desired pattern.

The substrate 13 then moves down by a small distance (typically of the order of 0.1 mm) to prepare for growth of the next layer. After a pause for the melted powder to solidify, the roller 12 proceeds to roll another layer of powder over substrate 13 in preparation for sintering. Thus as the process proceeds, a sintered part 15 is constructed, supported by unconsolidated powder parts 16. After the part has been completed, it is removed from substrate 13 and the unconsolidated powder 16 is recycled before being returned to the feed containers 10, 11.

Movement of the laser head 14 and modulation of the laser beam is determined by a Computer Aided Design (CAD) model of the desired profile and layout of the part.

Various embodiments of the substrate 13 for use in the powder bed system shown in FIG. 1 will now be described in detail.

FIGS. 2 to 4 illustrate a first embodiment of the substrate 13'. The substrate 13' has a build surface 20. The first layer of powder laid on the build surface 20 is fused to the build surface across substantially the entire base area of the part to be formed by the ALM process. This fixes the part to the substrate and substantially prevents curling of the part during the build. The substrate 13' is configured to provide relatively high stiffness in a direction (z) substantially perpendicular to the build surface, whilst having a low longitudinal stiffness in the plane (x-y) of the build surface.

The substrate 13' has an upper portion 21 nearest the build surface 20 and a lower portion 22. The material for the upper and lower portions 21, 22 is the same, and in this example is Titanium to provide a suitable match with the Ti 6-4 powder used to create the part 15. This material match is important for fusing the part to the substrate.

The upper portion 21 of the substrate includes an array of slits 23 extending from the build surface 20 through part of the thickness of the substrate. The slits 23 form a rectangular grid pattern across the build surface 20 to define an array of protrusions 24 with their longitudinal axis aligned with the build direction (z) and substantially perpendicular to the build surface 20.

The slits 23 have a width s of approximately 0.1 mm and a depth d of approximately 15 mm. The slits are regularly spaced approximately 3 mm apart such that the protrusions 24 are square section pillars, having a height of approximately 15 mm and a 3×3 mm cross section with parallel sides aligned with the z direction. The tops 25 of the pillars make up the build surface 20.

The slits 23 are cut by spark erosion, such as wire EDM, or may alternatively be laser cut. The substrate 13' may initially be similar to a conventional Titanium plate substrate for powder bed ALM. Cutting the slits 23 into the monolithic plate has the effect of maintaining high stiffness in the z direction whilst introducing relatively low longitudinal stiffness in the x-y plane of the build plate. Due to the slits 23 the resultant base of the pillars remain integrally formed with the lower portion 22 of the substrate, and the pillars act as beams for deflection in the x-y plane at the build surface 20.

In this way, the material shrinkage which occurs as the sintered powder solidifies during creation of each successive layer of the ALM part 15 is accommodated by bending of the pillars about their respective bases. This has the effect of closing up at least some of the slits 23, with this effect being most pronounced at the edges of the part 15. Naturally, this slightly disturbs the planar build surface such that small steps are created between adjacent pillars but this step is small due to the size (3×3 mm) of the top of the pillars and the very high aspect ratio of the slits, which in this example is 150. Generally, the higher the aspect ratio of the slits, the flatter the build surface will be at maximum deflection of the pillars.

The base of the slits 23 has a radius r of approximately 0.05 mm so as to function as crack inhibitors and prevent crack propagation through the substrate.

As shown in FIG. 4 the substrate 13' includes mounting holes 26, one at each corner of the substrate for fixing, e.g. by bolting, the substrate to the ALM system transport for raising/lowering the substrate.

It may generally be observed that the lower portion 22 of the substrate 13' is substantially isotropic, whilst the upper portion 21 having the slits 23 is anisotropic. The lower portion 22 is sufficiently stiff to prevent bending or curling of the substrate 13' during the build. The upper portion 21 maintains sufficient stiffness in the z-direction, whilst having a low longitudinal stiffness in the x-y plane of the build surface 20. The deformation in the upper portion 21 due to bending of the pillars is mostly elastic but the design accommodates a limited degree of plastic deformation, if particularly high residual stresses are created, e.g. due to the shape of the part being built.

In a conventional manner, the top 1 mm or so of the substrate 13' can be milled away after each build so as to redefine the build surface. This beneficially removes any material that may have plastically deformed during the last build. The substrate 13' is thus re-useable a plurality of times. With sufficient depth of the slits 23 the substrate 13' may be re-used up to approximately 5 to 10 times.

FIG. 5 illustrates an alternative embodiment of the substrate 13", which differs in that the slit grid occupies only a portion of the build surface 20 and in that the slit grid is oriented approximately along the diagonal of the rectangular build surface. These features may be provided independently or jointly as here. Providing the slits across only a portion of the build surface where the part is to be built may save production costs, as cutting the slits by spark erosion for example can be expensive. Orienting the slit grid to the diagonal of the build surface provides greater movement in the primary shrinkage directions of the part 15, which is typically oriented along the diagonal to maximise the size of part that can be built for a given rectangular build surface area.

Figures 6, 7:
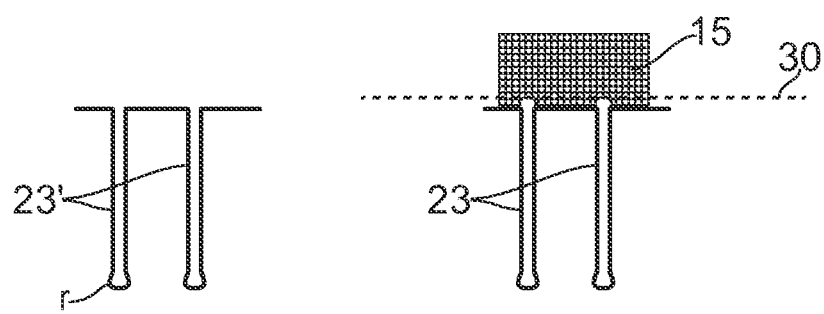
FIG. 6 illustrates a schematic partial view of the slits in the substrate.
FIG. 7 illustrates a partial schematic view of the substrate with a part built on the build surface.

FIG. 6 illustrates a schematic detailed view of the base of the slits 23' in accordance with another embodiment, in which the radiused base has a tear drop shape so as to maximise the radius r, thus further improving resistance to crack propagation through the substrate.

A gap between adjacent pillars defined by the slits 23 is typically air filled, but in an alternative embodiment this gap may be filled with a material different than that of the pillars, e.g. a ductile plastics material. Filling the slits may prevent the powder from falling into the slits. However, even with an air gap this is generally not problematic. The very narrow slit width s of approximately 0.01 mm is approximately twice the diameter of the powder particles used in the ALM process. This is beneficial as the powder particles will tend to easily bridge the slits in the build surface during application of the first or second powder layers. FIG. 7 illustrates this bridging effect, and also shows a cut line 30 for cutting the completed part 15 from the substrate 13 by wire EDM, or similar. As can be seen, this cut line 30 is disposed just above the bridging between adjacent pillars. This leaves a small thickness of the sintered powder material fused to the substrate, which is removed when the top layer of the substrate is milled after the build to redefine the build surface in readiness for a subsequent build.

Figure 8:
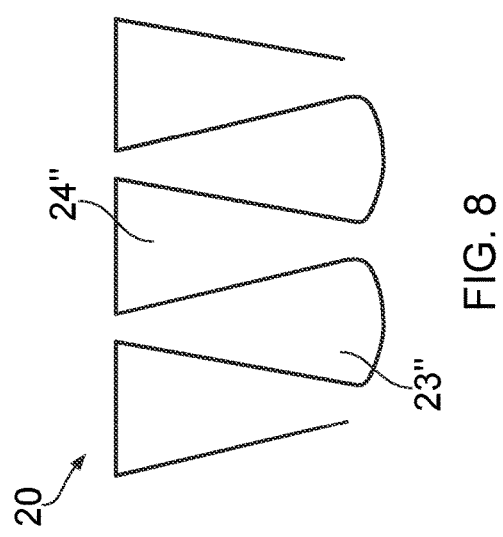
FIG. 8 illustrates a schematic partial view of protrusions of another embodiment of the substrate.

FIG. 8 illustrates schematically a yet further design of the protrusions and slits in the upper portion of the substrate. The protrusions 24" have a tapered shape, as compared with this straight sided protrusions described previously. The protrusions 24" retain a substantially rectangular cross section but have a taper of increasing cross section towards the build surface 20. The slits 23" have a corresponding taper of increasing cross section away from the build surface 20. The tapered protrusions are advantageous in that the base has a reduced cross section, which promotes greater bending of the beam like protrusions in the x-y plane at the build surface 20. The slits 23" however may be more difficult to manufacture. Accordingly, it may be preferable to manufacture the substrate having the protrusions in the upper portion by an ALM process, such as that described above. Forming re-entrant or undercut projections is generally straightforward in ALM.

Figure 9:
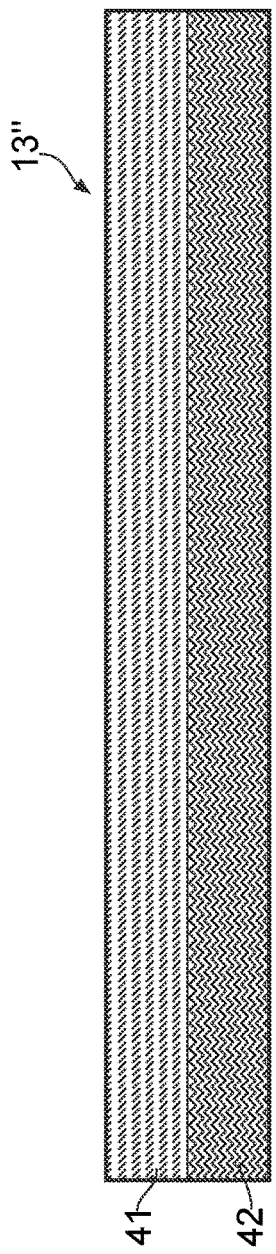
FIG. 9 illustrates a cross section view of another embodiment of the substrate having upper and lower portions including different materials.

Finally, FIG. 9 illustrates a yet further embodiment of the substrate 13''' having an upper portion 41 of a first material and a lower portion 42 of a second material. By contrast with the embodiments described above both the upper and lower portions are solid, and the upper portion in particular is free from slits. The lower portion has a higher stiffness than the upper portion. For example, the upper portion 41 includes a material of high ductility and low yield strength such as grade 1 or grade 2 pure Titanium. This provides a good match for the Titanium 6-4 material used to form the part as the part will readily fuse to the substrate.

Alternatively, the upper portion 41 may include a material of low elastic modulus and high strain to failure as compared with the material of the part intended to be fused to it during the additive manufacturing process. For example, a superelastic material such as the shape memory alloy Nitinol may be used, which includes approximately 50% Ni and 50% Ti. The upper portion 41 includes a material that is weldable with the material of the part intended to be fused to it during the additive manufacturing process. The large proportion of Titanium in Nitinol would satisfy this requirement when building parts from Titanium powder by ALM.

Where different materials are provided for the upper and lower portions of the substrate, the overall depth of the substrate may increase slightly as compared with the embodiments described with reference to FIGS. 2 to 4.

Once the build has completed and the part has been removed from the substrate, the part is typically heat treated to reduce any remaining residual stresses. So long as the modified substrate in accordance with this invention can prevent crack initiation during the build, due to the increased strain deformation across the build surface, then the finished part should be free from stress induced defects.

Although the invention has been described above with reference to one or more preferred embodiments, it will be appreciated that various changes or modifications may be made without departing from the scope of the invention as defined in the appended claims.

The invention claimed is:

1. A system for creating a part by an additive manufacturing process, the system including a substrate having a build surface for fusing to a part being formed on the substrate by the additive manufacturing process, wherein the substrate is re-useable for building successive parts by the additive manufacturing process, wherein the substrate has an upper portion nearest the build surface and a lower portion, wherein the upper portion includes an array of protrusions with their longitudinal axis aligned substantially perpendicular to the build surface, and wherein the protrusions include a different material to that of the lower portion, and the protrusions are not incorporated in the part created on the substrate.

2. A system according to claim 1, wherein tops of the protrusions provide at least a portion of the build surface.

3. A system according to claim 1, wherein bases of the protrusions are integrally formed with the lower portion of the substrate.

4. A system according to claim 1, wherein the protrusions are slender and take the form of pillars having a generally planar top.

5. A system according to claim 1, wherein the protrusions each have straight sides substantially perpendicular to the build surface.

6. A system according to claim 1, wherein the substrate is a monolith.

7. A system according to claim 1, wherein a gap between adjacent protrusions is filled by a material dissimilar to that of the protrusions.

8. A system according to claim 1, wherein the array of projections are defined by an array of slits.

9. A system according to claim 8, wherein the slits have a width of 0.1 mm or below.

10. A system according to claim 8, wherein the slits form a grid.

11. A system according to claim 8, wherein the slits have a substantially uniform width.

12. A system according to claim 8, wherein the base of each slit has a radius corner.

13. A system according to claim 1 configured to create the part layer by layer.

14. A system according to claim 13, configured to create the part by selectively sintering successive powder layers.

15. A system for creating a part by an additive manufacturing process, the system including a substrate having a build surface for fusing to a part being formed on the substrate by the additive manufacturing process, wherein the substrate is re-useable for building successive parts by the additive manufacturing process, wherein the substrate has an upper portion nearest the build surface and a lower portion, wherein the upper portion includes an array of protrusions with their longitudinal axis aligned substantially perpendicular to the build surface, and wherein the protrusions are slender, having an aspect ratio of at least 3, and take the form of pillars having a generally planar top.

16. A system according to claim 15, wherein tops of the protrusions provide at least a portion of the build surface.

17. A system according to claim 15, wherein bases of the protrusions are integrally formed with the lower portion of the substrate.

18. A system according to claim 15, wherein the protrusions each have straight sides substantially perpendicular to the build surface.

19. A system according to claim 15, wherein the substrate is a monolith.

20. A system according to claim 15, wherein a gap between adjacent protrusions is filled by a material dissimilar to that of the protrusions.

21. A system according to claim 15, wherein the array of projections are defined by an array of slits.

22. A system according to claim 21, wherein the slits have a width of 0.1 mm or below.

23. A system according to claim 21, wherein the slits form a grid.

24. A system according to claim 21, wherein the slits have a substantially uniform width.

25. A system according to claim 21, wherein the base of each slit has a radius corner.

26. A system according to claim 15, configured to create the part layer by layer.

27. A system according to claim 26, configured to create the part by selectively sintering successive powder layers.

28. A system for creating a part by an additive manufacturing process, the system including a substrate having a build surface for fusing to a part being formed on the substrate by the additive manufacturing process, wherein the substrate is re-useable for building successive parts by the additive manufacturing process, wherein the substrate has an upper portion nearest the build surface and a lower portion, wherein the upper portion includes an array of protrusions with their longitudinal axis aligned substantially perpendicular to the build surface, wherein the protrusions each have a taper of increasing cross section towards the build surface and wherein the array of projections are defined by an array of slits, wherein the slits have a width of 0.1 mm or below.

29. A system according to claim 28, wherein tops of the protrusions provide at least a portion of the build surface.

30. A system according to claim 28, wherein bases of the protrusions are integrally formed with the lower portion of the substrate.

31. A system according to claim 28, wherein the protrusions are slender and take the form of pillars having a generally planar top.

32. A system according to claim 28, wherein the substrate is a monolith.

33. A system according to claim 28, wherein a gap between adjacent protrusions is filled by a material dissimilar to that of the protrusions.

34. A system according to claim 28, wherein the slits are provided in an upper portion of the substrate, and a lower portion of the substrate is substantially solid.

35. A system according to claim 28, wherein the slits form a grid.

36. A system according to claim 35, wherein the slits have a substantially uniform width.

37. A system according to claim 35, wherein the base of each slit has a radius corner.

38. A system according to claim 28, configured to create the part layer by layer.

39. A system according to claim 38, configured to create the part by selectively sintering successive powder layers.

40. A system for creating a part by an additive manufacturing process, the system including a substrate having a build surface for fusing to a part being formed on the substrate by the additive manufacturing process, and a plurality of slits extending from the build surface through part of the thickness of the substrate, wherein the substrate is re-useable for building successive parts by the additive manufacturing process, wherein the build surface is substantially rectangular, wherein the slits form a grid and are provided on only a portion of the build surface, and wherein the grid is aligned substantially with a diagonal of the build surface.

41. A system according to claim 40, wherein the slits are provided in an upper portion of the substrate, and a lower portion of the substrate is substantially solid.

42. A system according to claim 40, wherein the slits have a substantially uniform width.

43. A system according to claim 40, wherein the substrate is a monolith.

44. A system according to claim 40, wherein the base of each slit has a radius corner.

45. A system according to claim 40, wherein the slits have a width of 0.1 mm or below.

46. A system according to claim 40, configured to create the part layer by layer.

47. A system according to claim 46, configured to create the part by selectively sintering successive powder layers.

* * * * *